United States Patent [19]
Parkas et al.

[11] Patent Number: 5,787,341
[45] Date of Patent: Jul. 28, 1998

[54] FITTING PIECE IN A MOBILE STATION FOR ITS ATTACHMENT DEVICE

[75] Inventors: Tapio Parkas; Mika Kontkanen, both of Salo, Finland

[73] Assignee: Nokia Mobile Phones Ltd., Salo, Finland

[21] Appl. No.: 661,215

[22] Filed: Jun. 10, 1996

[30] Foreign Application Priority Data

Jun. 30, 1995 [FI] Finland ................... 953248

[51] Int. Cl.$^6$ ........................................ H04B 1/38
[52] U.S. Cl. ................ 455/90; 224/191; 224/269; 455/351; 455/575
[58] Field of Search .................. 455/90, 575, 95, 455/100, 128, 347, 351; 379/428, 440, 446, 454; 361/814, 825; 22/191, 230, 269; 24/3.7; 312/7.1

[56] References Cited

U.S. PATENT DOCUMENTS

| | | | |
|---|---|---|---|
| 3,370,236 | 2/1968 | Walker | 455/575 |
| 3,668,528 | 6/1972 | Hutchinson et al. | 455/351 |
| 3,693,089 | 9/1972 | Hutchinson et al. | 455/351 |
| 3,743,147 | 7/1973 | Wilczynski | 455/351 X |
| 3,878,589 | 4/1975 | Schaefer | 224/269 X |
| 4,578,739 | 3/1986 | McKee et al. | 455/351 X |
| 5,189,632 | 2/1993 | Paajanen et al. | 364/705.05 |
| 5,200,997 | 4/1993 | Leman | 379/428 |
| 5,214,309 | 5/1993 | Saarnimo | 257/712 |
| 5,229,701 | 7/1993 | Leman et al. | 320/2 |
| 5,241,592 | 8/1993 | Carlson et al. | 455/90 X |
| 5,253,146 | 10/1993 | Halttunen et al. | 361/784 |
| 5,261,583 | 11/1993 | Long et al. | 224/269 X |
| 5,265,158 | 11/1993 | Tattari | 379/433 |
| 5,271,056 | 12/1993 | Pesola et al. | 455/550 |
| 5,361,459 | 11/1994 | Hyvonen et al. | 24/35 |
| 5,597,102 | 1/1997 | Saarikko et al. | 224/191 X |

*Primary Examiner*—Thomas Mullen
*Attorney, Agent, or Firm*—Perman & Green, LLP

[57] ABSTRACT

The invention relates to a mobile station which can be attached to a target, removed from it and re-attached to it by use of an attachment device which comprises: a support stud (2) attached to a mobile station with a fitting piece (3); and a carrying device (1) in the target, having elements for the detachable grip on the support stud. The fitting piece is formed of a U-shaped plate (4) having a first branch (5a) on the outer surface of which said support stud is located and a second branch (5b) which in the operating state is located in an attachment cavity (6) of the rear cover (22) of the mobile station. The first branch of the U-plate rests against the outer surface (21) of the rear cover of the mobile station (20) and the second branch rests against the inner surface (23) of the rear cover.

15 Claims, 1 Drawing Sheet

FITTING PIECE IN A MOBILE STATION FOR ITS ATTACHMENT DEVICE

BACKGROUND OF THE INVENTION

The invention relates to a fitting piece in a mobile station for an attachment device with which the mobile station can be attached to a target and detached from the place of attachment and re-attached to it, the attachment device comprising: a support stud attached to a mobile station with a fitting piece; and a carrying means in the target, having elements for the detachable grip on the support stud. The invention also relates to a mobile phone equipped with such a fitting piece.

As the number of mobile stations increases people need more often to carry these stations, like mobile phones or paging devices, with them. Carrying a phone, for example, in one's hand is inconvenient and as the phone is unattached it is easy to forget to take it along. Carried in a pocket, a mobile station might get bumped or it might fall and get broken. To solve these problems, various racks have been developed which can be attached to a belt into which a mobile station, particularly a phone, can be attached when not used but carried along. However, a disadvantage of these racks has been their rigid and complex structure and the size of the fastening device attached to the phone. When the phone is attached to a belt vertically, it is not possible to turn it forward or backward around the point of attachment, e.g. when sitting down, and therefore the phone may have caused a feeling of pressure on the user's waist.

Earlier non-public patent application FI-942306 discloses an attachment device to be used together with a mobile station which can be removed from the attachment device and reinstalled into it. The attachment device comprises e.g. a carrying means to be fastened to a belt and a support stud attached to the mobile station with a fitting piece. The carrying means includes elements to receive a support stud, and the support stud has a neck part and a wider end consisting of a flange which is gripped by the aforementioned elements in the carrying means. The fitting piece is trough-like and attached on top of the rear cover of a mobile station by means of grooves in the outer surfaces of the mobile station. While this kind of fitting piece is easy to attach, it is relatively big in size and may inadvertently come off the mobile station if twisted with strength, whereby the mobile station may fall.

An object of the invention is to provide a fitting piece for a mobile attachment device such as the one described above, which will not come off the mobile station in any operating conditions, not even when the mobile station is turned or twisted with strength while it is attached to a body part in a belt, for example. A second object of the invention is to provide such a fitting piece, which is small in size and can be easily attached to a mobile station and detached from it, when needed. A third object of the invention is to provide such a fitting piece, which can be installed in different mobile stations unchanged, ie. one and the same fitting piece can be used in mobile stations which have different shapes and outer dimensions. A particular object of the invention is to provide a fitting piece for an attachment device with which a mobile station can be attached to the clothing of the person carrying the mobile station in such a way that the mobile station can be turned around its point of attachment and with which the mobile station can be attached to other targets as well, e.g. to a rack or the like in a car or elsewhere.

These objects are achieved with a fitting piece according to the invention, the main characteristics of which are described in the claims attached hereto.

For reasons of simplicity, the invention will be described with the assumption that the mobile station is a phone attached to the user's belt. It is clear that the fitting piece according to the invention can also be used in conjunction with other mobile stations, such as paging devices, and it can be attached to other garments as well, e.g. to the brim of an accessory or a pocket, the brim of a bag or to other locations in these items and to other appropriate targets, such as parts, devices or equipment or the like in a vehicle or elsewhere. To that end, the carrying means in question is attached to the target in an appropriate way.

SUMMARY OF THE INVENTION

The attachment device, to which the invention relates, comprises two parts: an attachment device carrying means, which remains on the belt when the phone is being used, and a support stud attached to the phone with a fitting piece. The phone is locked onto a belt, for example, and detached from it by means of a locking tongue. While on the belt, the phone can be turned around the axis of the support stud when necessary, whereby the user can, e.g. when sitting, easily turn the phone forward or backward around the axis of the support stud so that the phone will not press the user's waist. The phone can easily be removed from the belt by gripping the carrying means attached to the belt, releasing the locks if necessary, and at the same time lifting the phone up. The construction according to the invention facilitates easy removal of the phone from the belt without breaking or scratching the belt or the phone. When attaching the phone to the belt, the user only has to push the phone down to the carrying means of the attachment device, whereby the phone is locked to the body part by means of a locking tongue acting in a spring-like manner and an inward-bent flange-like edge circling the body part.

The invention is described in more detail with reference to the accompanying drawing.

DETAILED DESCRIPTION OF THE PREFERRED EMBODIMENT

Figure 1A:
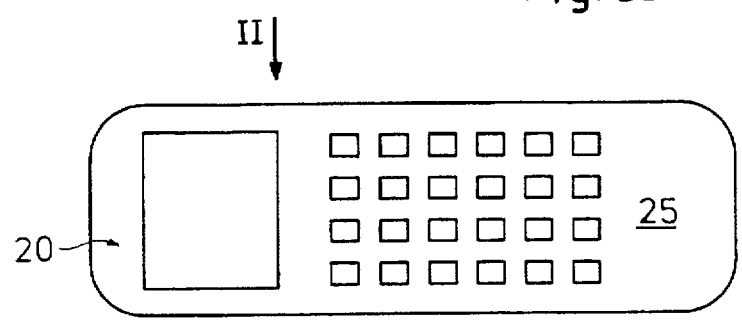
FIG. 1A is a top view of a mobile station, ie. seen from the side of the display and possible keypad, from direction I of FIG. 1B.
Figure 1B:
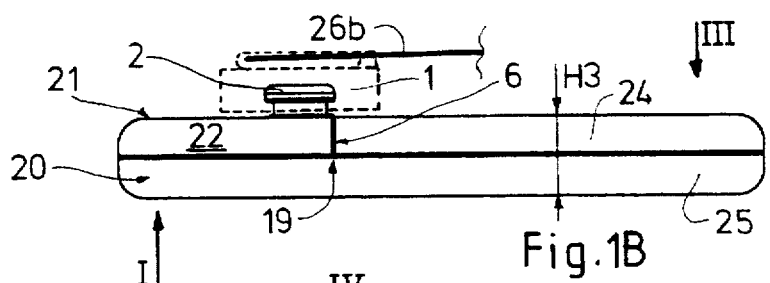
FIG. 1B shows the mobile station of FIG. 1A provided with the fitting piece according to the invention, seen from direction II of FIG. 1A.
Figure 1C:
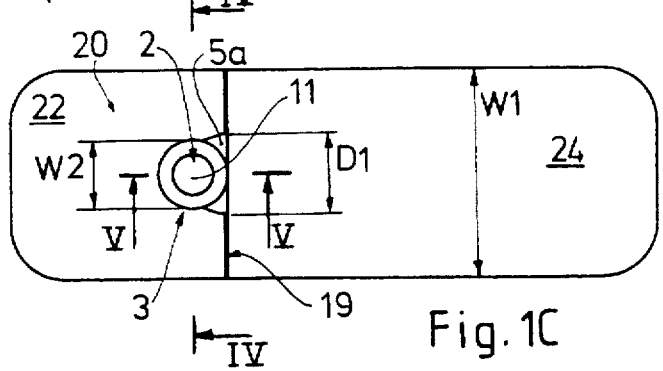
FIG. 1C is a bottom view of the mobile station of FIGS. 1A and 1B provided with the fitting piece according to the invention, seen from direction III of FIG. 1B.

The accompanying FIGS. 1A to 1C generally depict a mobile station 20 which is a mobile phone, for example, This mobile station 20 comprises a housing consisting of a rear cover 22 and a front cover 25. In this case, the length of the rear cover 22 is shorter than the length of the front cover 25, whereby a space is created for a battery case 24 or for a power supply part in general. In the mobile station shown in the figures, the display and keypads are located on the front cover 25 side, whereas the replaceable battery case 24 or other power source or power supply case or power supply entity, which can at any time be removed and installed by the user, is located on the rear cover 22 side. The rear cover may cover only the rear side of the mobile station but usually it extends to at least part of the thickness H3 of the mobile station. In the embodiment of the figures, the rear cover 22 extends approximately to the middle of the thickness dimension parallel to thickness H3, butt it could also extend up to the plane of the front cover 25 as well. The fitting piece according to the invention which will be discussed below can according to the invention be located anywhere in the area of the peripheral dimension of the rear cover, like e.g. on a side of the mobile station. Usually it is preferable, however, to locate the fitting piece, as shown in the figures, in that portion of the rear cover which faces away from the plane of the front cover and which, as such, may be shaped as desired.

Figure 2:
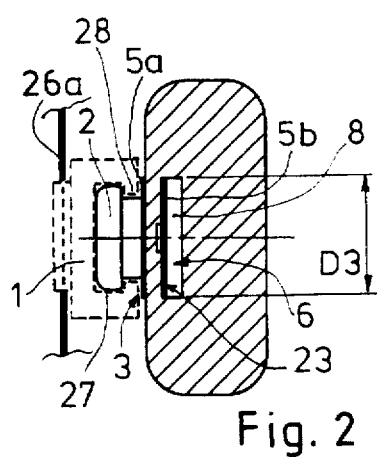
FIG. 2 is a cross section of the mobile station of FIGS. 1A to 1C along plane IV—IV of FIG. 1C, with the size englarged a little.

Such a mobile station can be attached to the belt or other garment of the user or to another target with an attachment device comprising a support stud 2 fastened to the mobile station with a fitting piece 3 and a carrying means 1 attached to the clothing or elsewhere and having elements for the detachable grip on the support stud. In FIGS. 1B and 2, the carrying means 1 is drawn schematically with a dashed line and the belt 26a and the brim of a pocket 26b suggestively. The carrying means thus provides a place of attachment to which a mobile station can be attached and from which it can be removed repeatedly. Of course, the carrying means may be a rack or the like when the mobile station is to be attached to a target other than clothing. The carrying means 1 includes guide grooves 27 which grip the wide flange 9 at the end of the support stud 2. These guide grooves 27 are shaped such that a support stud 2 can be pushed from one direction into the bottom of the grooves, in which position the locking element of the carrying means 1, which is not shown, is pressed into the locking hollow 11 in the middle of the end of the support stud 2, thus preventing the support stud 2 and thereby the mobile station from coming off the carrying means 1 In addition, the carrying means includes an arrangement not shown in the figures for releasing the locking between the guide grooves 27 of the carrying means and a support stud 2 to detach the mobile station 20 from the carrying means so that it can be used. The guide grooves 27 are formed by flanges 28 that are positioned at the narrower neck part 10 of the support stud 2. When the support stud has a circular flange 9 in the guide grooves 8 or the support stud can revolve about its mounting axis, it can rotate and allows the mobile station to turn when necessary. However, a tongue or the like which is pushed into the support stud prevents the mobile station from coming off the carrying means. The support stud 2 is attached to the mobile station in any practical manner not described in this document.

The fitting piece 3, with which a support stud 2 is attached according to the invention to a mobile station 20, constitutes a U-shaped plate 4 having a first branch 5a and a second branch 5b and a bottom 7 of the U-shape from which said branches 5a, 5b project approximately parallel to each other. The rear cover 22 of the mobile station has a cavity for the second branch 5b of the U-shaped plate 4. The cavity 6, extends from the boundary 19 between the rear cover 22 and the battery case 24 to the rear cover side. The side surface of this cavity 6, which is substantially parallel to the outer surface 21 of the rear cover, constitutes the inner surface 23 of the rear cover for the second branch 5b of the fitting piece 3. The distance H1 between the outer surface 21 and the inner surface 23 of the rear cover 22 approximately equals the distance H2 between the first branch 5a and the second branch 5b of the U-shaped plate 4. Now, when this U-shaped fitting piece 3 is inserted at the boundary between the rear cover and the battery case in such a manner that the first branch 5a rests against the outer surface 21 of the rear cover and the second branch 5i b 1 faces the inner surface 23 of the rear cover in the cavity, and pushed so deep that the bottom 7 of the U-shape is placed against the outer edge 12 of the rear cover at this boundary 19, the first branch 5a faces the outer surface of the rear cover and the second branch faces the inner surface 23 of the rear cover. When the battery case 24 is thereafter inserted, it is obvious that the fitting piece 3 has become attached to its place securely and in a manner such that the load directed to it is transferred to the rear cover 22 of the mobile station and not to the battery case, for example.

In this arrangement, the support stud 2 is advantageously fixed permanently to the outer surface of the first branch 5a of the U-shaped plate 4, that is, to that surface which faces away from the second branch 5b of the fitting piece, as can be seen in the figures, whereby the support stud projects directly outwards from the surface of the rear cover 22. Alternatively, the support stud can be attached to the edge of the first branch or a projection of the first branch, which projection may be parallel to the first branch or form an angle with it, whereby the support stud projects from the rear cover either directly outwards or in another direction, such as to the side. Then the mobile station can be attached by this support stud 2 as described above to the carrying means 1. Also in this arrangement, the opening direction of the U-shape of the fitting piece 3 is approximately parallel to the outer surface 21 of the rear cover 22 and is directed from the battery case 24 towards the rear cover 22. This design makes it possible to attach the fitting piece according to the invention to the mobile station independent of the rest of the external design of the mobile station. The smaller the fitting piece 3, the freer the design of the mobile station. In any case, the total length D2 and total width D1 of the U-plate are smaller than the width W1 of the mobile station at the location of the fitting piece, which enables the aforementioned structure of the fitting piece 3 according to the invention and its attachment to a mobile station. Typically, the total length D2 and total width D1 of the fitting piece are both less than half the width W1 of the mobile station at the location of the fitting piece. An advantageous total length D2 and total width D1 for the U-plate of the fitting piece is the diameter W2 of the support stud 2, as in the embodiment shown in the figures. It is clear that the total length and total width of the fitting piece 3 can be smaller, but then a relatively strong force will be directed to a small area of the rear cover 22 of the mobile station, which is no longer advantageous.

Figure 4A:
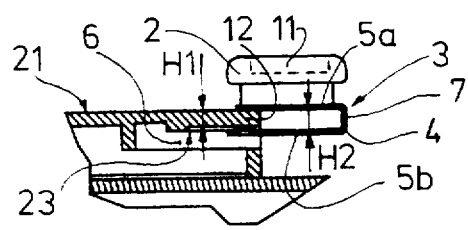
FIGS. 4A and 4B show a longitudinal section of a second embodiment of the fitting piece according to the invention and its attachment along plane V—V of FIG. 1C, with the fitting piece almost detached and, correspondingly, pressed fully into its operating position.
Figure 4B:
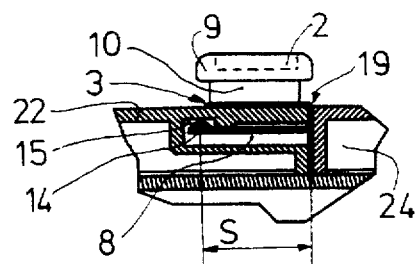
Figure 3A:
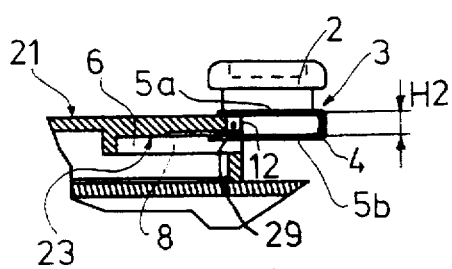
FIGS. 3A and 3B show a longitudinal section of a first embodiment of the fitting piece according to the invention and its attachment along plane V—V of FIG. 1C, with the fitting piece almost detached and, correspondingly, pressed fully into its operating position.
Figure 3B:
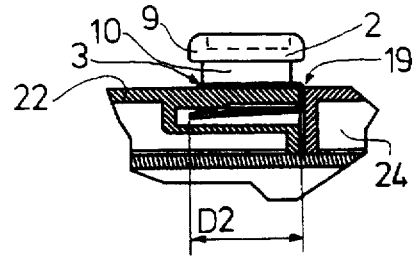

The cavity 6 in the mobile station consists e.g. of a trough 8 inside the rear cover 22, as in FIGS. 3A and 4A, or of a channel 8 inside the rear cover, as in FIGS. 3B and 4B and 2. The width D3 of this trough or channel is slightly, but only slightly, bigger than the width D1 of the second branch, whereby the second branch can be pushed, retaining its direction, onto the surfaces 21, 23 of the rear cover 22. Thus, that side surface of this trough or channel 8 which is closest to being parallel to the outer surface 21 of the rear cover constitutes the inner surface 23 of said rear cover for the second branch 5b. Depending on the thickness of the U-shaped plate and on the fitting tightness of the slot between the rear cover 22 and the battery case 24, it may be necessary to form a recess 29 in the outer edge 12 of the rear cover facing the battery case for the bottom 7 of the U-plate. The recess 29 is not shown distinctly in FIGS. 3B and 4A–4B, since in the figures the U-shaped plate 4 is manufactured of thin and strong metal sheet. If the U-shaped plate is made of another material, such as plastic, it has to be designed a little thicker, whereby the recess 29 mentioned above is required. The first surface 21 of the rear cover and the second surface 23 may also be surfaces other than the outer surface and the inner surface. For example, the first surface 21 may be a surface of a groove inside the rear cover, and the second surface 23 another surface related to the rear cover.

By making the distance H1 between the inner surface 23 of the cavity 6 and the outer surface 21 of the rear cover such that it increases in a wedge-like manner towards the rear cover 22, starting from the boundary between the rear cover and the battery case of the mobile station, while at the same time the distance H2 between the first branch 5a and the second branch 5b is substantially constant, the spring force produced by the U-shape of the fitting piece can be utilized for pressing the first branch 5a against the outer surface 21 of the rear cover. With this design, if the first and the second branch are parallel, the wedge-like shape of the rear cover cavity 6 pushes the outer edge of the second branch 5b away from the first branch 5a, whereby this first branch is pressed against the outer surface 21, as can be easily understood from FIG. 3B. This wedge-like shape need not apply to all of the inner surface 23 but it suffices that part of the surface is shaped such. This effect can be boosted by shaping the outer edge that faces away from the bottom 7 of the U-shape or a location near that outer edge of the second branch 5b of the U-shape of the fitting piece into a tongue or projection 14 facing the first branch. This way, the required pressing force can be adjusted independent of the material thickness elsewhere in the U-shaped plate 4 of the fitting piece 3. This pressing force can be further adjusted by forming in the second branch of the plate 4 a longitudinal elastic slip which serves as a spring.

The fitting piece 3 can be locked into its position even more securely by utilizing the same tongue or projection described in the paragraph above or another similar tongue or projection 14. This is done by making a hollow 15 on the inner surface 23 of the cavity 6 at distance S, which corresponds to the distance of the tongue or projection 14 in the fitting piece from the bottom 7 of the U-shape, from the rear cover edge 12 facing the battery case. When the fitting piece 3 is in this case pushed to the bottom, as shown in FIG. 4B, this projection 14 snaps into the hollow 15 described above, thus preventing the fitting piece 3 from being pulled out even if the battery case 24 were out of its place. In this case, too, the locking can be improved by suitably selecting the dimensions of the projection 14 and hollow 15, while at the same time keeping the fitting piece 3 removable, if desired.

With the fitting piece described above the support stud 2 can be kept securely and reliably attached to the mobile station, but if, however, the manner of operation of the mobile station is changed, the support stud can be removed by pulling the fitting piece 3 to a direction opposite to the opening direction of the U-shape, thus releasing the fitting piece from the rear cover 22. Naturally, the battery case has to be removed before that. Thus, the battery case 24, when inserted in its place, locks the fitting piece 3 securely and permanently, but since the user can remove the battery case for a change of batteries, the fitting piece can then be installed and removed, as described above. The fitting piece can never come off accidentally, but it can only be removed on purpose. To that end, the power supply case or power supply assembly 24 is located against the bottom 7 of the U-plate of the fitting piece on that side of the U-plate which is opposite to the opening direction of the U-shape. It is obvious that all that is said above is true even if the battery case was replaced by another type of battery assembly or by cells and a cell casing or other power source, in other words, a power supply part in general.

We claim:

1. A fitting piece in a mobile station for an attachment device with which the mobile station can be attached to a target and detached therefrom and re-attached thereto comprising: a support stud (2) attached to a mobile station with a fitting piece (3); and a carrying means (1) in a target, having elements for the detachable grip on the support stud, characterized in that the fitting piece (3) is formed of a U-shaped plate (4) having a first branch (5a) in which said support stud (2) is located and a second branch (5b) which in the operating state is located in an attachment cavity (6) in the rear cover of the mobile station, whereby the first branch (5a) of the U-plate (4) rests against a first surface (21) of the rear cover (22) of the mobile station (20) and the second branch (5b) rests against a second surface (23) of the rear cover (22) in the cavity.

2. A fitting piece in a mobile station according to claim 1, characterized in that, in the mobile station (20), the cavity (6) in the rear cover of the mobile station extends from the boundary (19) between the rear cover (22) and power supply part (24) of the mobile station to the rear cover, whereby the bottom (7) of the U-shape of the fitting piece is located at this boundary (19) and the opening direction of the U-shape of the fitting piece (3), when installed, points from the power supply part (24) to the direction of the rear cover (22) and that the fitting piece support stud (2) comprises a neck part (10) and an end consisting of a wider flange (9) and a locking hollow (11) in the middle of the end and which is located on the outer surface of the first branch (5a).

3. A fitting piece in a mobile station according to claim 1, characterized in that the total length (D2) and total width (D1) of the U-plate in the fitting piece (3) are smaller than the width (W1) of the mobile station at the location of the fitting piece, wherein the total length and total width are each less than half the width of the mobile station at the location of the fitting piece and that the U-shaped plate (4) of the fitting piece is metal.

4. A fitting piece in a mobile station according to claim 3, characterized in that the cavity (6) in the mobile station comprises: a trough or channel (8) inside the rear cover (22), the width (D3) of which slightly exceeds the width (D1) of the second branch and the side surface of which constitutes said inner surface (23) for the second branch (5b); and, a recess (29) for the bottom (7) of the U-plate in that edge (12) of the rear cover that faces the power supply part; and that the first surface (21) is the outer surface of the rear cover and the second surface (23) is the inner surface (23) of the rear cover.

5. A fitting piece in a mobile station according to claim 4 characterized in that the distance (H1) between the second surface (23) and the first surface (21) of the rear cover increases from the boundary (19) between the rear cover and the power supply part of the mobile station towards the rear cover (22) at least for a portion of the second surface, a tongue or projection (14) pointing to the first branch at or near the outer edge of the second branch (5b) of the U-shape of the fitting piece (3) to press the first branch (5a) by means of the spring force of the U-shape of the fitting piece against the first surface (21) of the rear cover.

6. A fitting piece in a mobile station according to claim 5 characterized in that there is, on the second surface (23) of the rear cover, at a distance (S), which corresponds to the distance of the tongue or projection (14) in the second branch of the fitting piece from the bottom (7) of the U-shape, from the rear cover edge (12) facing the power supply part, a hollow (15) into which the tongue or projection (14), which faces the first branch and is located at or near the outer edge of the second branch (5b) of the U-shape of the fitting piece (3), can snap to lock the fitting piece into its place.

7. A fitting piece in a mobile station according to claim 6, characterized in that the power supply part (24) locks the fitting piece (3) irremovably into its place, to which end the power supply part is located against the bottom (7) of the U-plate (4) of the fitting piece on the side opposite to the opening direction of the U-shape, and that the power supply part is a power supply assembly.

8. A fitting piece according to claim 1, characterized in that the target to which the mobile phone (20) is attached to a carrying device, and that the carrying means (1) is attached to a target.

9. In a mobile phone assembly which, by means of an attachment device, can be attached to a target and detached therefrom and re-attached thereto, the attachment device comprising: a support stud (2) attached to a mobile phone with a fitting piece (3); and a carrying means (1) in a target, having elements for the detachable grip on the support stud, characterized in that the fitting piece (3) is formed of a U-shaped plate (4) having a first branch (5a) in which said support stud (2) is located and a second branch (5b) which in the operating state is located in an attachment cavity (6) in the rear cover of the mobile phone, whereby the first branch (5a) of the U-plate (4) rests against a first surface (21) of the rear cover (22) of the phone (20) and the second branch (5b) rests against a second surface (23) of the rear cover (22) in the cavity.

10. A mobile phone assembly according to claim 9, characterized in that, in the mobile phone (20), the cavity (6) in the rear cover extends from the boundary (19) between the rear cover (22) of the phone and the power supply part (24) of the mobile station to the rear cover, whereby the bottom (7) of the U-shape of the fitting piece is located at this boundary (19) and the opening direction of the U-shape of the fitting piece (3), when installed, points from the power supply part (24) to the direction of the rear cover (22) and that the fitting piece includes a support stud (2) which comprises a neck part (10) and an end consisting of a wider flange (9) and a locking hollow (11) in the middle of the end and which is located on the outer surface of the first branch (5a).

11. A mobile phone assembly according to claim 9, characterized in that the cavity (6) in the mobile phone comprises: a trough or channel (8) inside the rear cover (22), the width (D3) of which slightly exceeds the width (D1) of the second branch and the side surface of which constitutes said inner surface (23) for the second branch (5b); and a recess (29) for the bottom (7) of the U-plate in that edge (12) of the rear cover which faces the power supply part; and that the first surface (21) is the outer surface of the rear cover and the second surface (23) is the inner surface (23) of the rear cover.

12. A mobile phone assembly according to claim 11, characterized in that the distance (H1) between the second surface (23) and the first surface (21) of the rear cover increases from the boundary (19) between the rear cover and the power supply part of the phone towards the rear cover (22) at least for a portion of the second surface, a tongue or projection (14) pointing to the first branch at or near the outer edge of the second branch (5b) of the U-shape of the fitting piece (3) to press the first branch (5a) by means of the spring force of the U-shape of the fitting piece against the first surface (21) of the rear cover.

13. A mobile phone assembly according to claim 12, characterized in that there is, on the second surface (23) of the rear cover, at a distance (S), which corresponds to the distance of the tongue or projection (14) in the second branch of the fitting piece from the bottom (7) of the U-shape, from the rear cover edge (12) facing the power supply part, a hollow (15) into which the tongue or projection (14), which faces the first branch and is located at or near the outer edge of the second branch (5b) of the U-shape of the fitting piece (3), can snap to lock the fitting piece into its place.

14. A mobile phone assembly according to claim 13, characterized in that the power supply part (24), when installed, locks the fitting piece (3) irremovably into its place, to which end the power supply part is located against the bottom (7) of the U-plate (4) of the fitting piece on the side opposite to the opening direction of the U-shape, and that the power supply part is a power supply assembly, and that the rear cover (22) of the mobile phone extends up to the height of at least one edge of the mobile station or phone.

15. A mobile phone assembly according to claim 9, characterized in that the total length (D2) and total width (D1) of the U-plate in the fitting piece (3) are smaller than the width (W1) of the mobile phone at the location of the fitting piece, wherein the total length and total width are each less than half the width of the mobile phone at the location of the fitting piece and that the U-shaped plate (4) of the fitting piece is metal.

* * * * *